United States Patent [19]
Kobayashi

[11] Patent Number: 5,986,785
[45] Date of Patent: Nov. 16, 1999

[54] ELECTRONIC APPARATUS WITH OPTICAL COMMUNICATION CAPABILITY

[75] Inventor: Fumiyuki Kobayashi, Tokyo, Japan

[73] Assignee: NEC Corporation, Tokyo, Japan

[21] Appl. No.: 08/818,972

[22] Filed: Mar. 14, 1997

[30] Foreign Application Priority Data

Mar. 14, 1996 [JP] Japan ..................................... 8-057915

[51] Int. Cl.⁶ .................................................. H04B 10/00
[52] U.S. Cl. .......................... 359/152; 250/353; 356/418; 359/193; 359/234
[58] Field of Search ..................................... 359/152, 193, 359/234, 578; 356/416, 418; 250/353; 340/567, 556, 557

[56] References Cited

U.S. PATENT DOCUMENTS

| 4,451,734 | 5/1984 | St. Jean et al. ...................... 250/353 X |
| 5,245,179 | 9/1993 | Chang ................................. 356/418 X |
| 5,491,582 | 2/1996 | Fujita ................................. 359/234 X |
| 5,604,483 | 2/1997 | Giangardella et al. ............. 340/567 X |

FOREIGN PATENT DOCUMENTS

| 10782 | 1/1974 | Japan . |
| 116229 | 9/1981 | Japan . |
| 26003 | 2/1986 | Japan . |
| 3010 | 1/1990 | Japan . |
| 160408 | 7/1991 | Japan . |
| 50969 | 4/1992 | Japan . |
| 161831 | 6/1992 | Japan . |
| 191728 | 7/1993 | Japan . |
| 160674 | 6/1994 | Japan . |
| 2119143 | 11/1983 | United Kingdom . |

*Primary Examiner*—Thomas Mullen
*Attorney, Agent, or Firm*—Scully, Scott, Murphy and Presser

[57] ABSTRACT

An electronic apparatus having an optical communication capability of the present invention has a casing 10 and optical filters 12 and 13 for screening an infrared beam emitting/receiving device 25. The optical filters 12 and 13 each has a particular screening characteristic. The filters 12 and 13 are selectively removably fitted in a beam input/output window 11 formed in the casing 10. With these filters 12 and 13, it is possible to use one of the filters 12 and 13 matching the varying environment, and therefore to intercept optical noise lying in a broad wavelength range.

5 Claims, 8 Drawing Sheets

ELECTRONIC APPARATUS WITH OPTICAL COMMUNICATION CAPABILITY

BACKGROUND OF THE INVENTION

The present invention relates to an electronic apparatus having an optical communication capability and, more particularly, to an electronic apparatus with an optical communication capability and having an optical filter capable of screening an infrared beam emitting/receiving device with a variable characteristic.

Some modern portable electronic apparatuses, e.g., electronic pocketbooks and note type word processors are capable of performing optical communication with other electronic apparatuses by interchanging data via their infrared beam emitting/receiving devices.

A conventional electronic apparatus has a casing formed with a beam input/output window in one side wall thereof. An infrared beam emitting/receiving device is disposed in the casing and faces the window.

Generally, light incident to the above apparatus includes components lying in the wavelength range adversely affecting the emitting/receiving device (optical noise). An optical filter having a preselected screening characteristic is fitted in the window in order to intercept the optical noise otherwise reaching the device and causing the apparatus to malfunction.

However, the problem with the conventional apparatus is that the optical filter fitted in the window cannot be replaced with another optical filter having a different screening characteristic in accordance with the varying environment. Specifically, the amount of needless infrared rays incident to the electronic apparatus differs from a dark place to a light place, e.g., from the indoor to the outdoor. When the screening amount of the filter is small, the filter cannot intercept the optical noise and causes the apparatus to malfunction.

To intercept optical noise of various wavelengths, use may be made of an optical filter having a great screening amount. This, however, brings about another drawback that the infrared beam for optical communication cannot be easily transmitted through the filter. Therefore, optical communication fails unless the distance over which the infrared beam is to be propagated is reduced.

Japanese Patent Laid-Open Publication No. 4-161831 proposes a detector using an infrared beam although it is different from an electronic apparatus with an optical communication capability. The detector is formed with a beam output window and a beam input window. Slidable restriction plates are mounted on the detector, and each is assigned to one of the windows. One of the restriction plates is slidable to reduce an infrared beam to be output via the associated window, and therefore the beam to be diffused around the detector. The other restriction plate is slidable to prevent the beam diffused around the detector from being incident to the associated window. These plates prevent the detector from malfunctioning. However, this kind of configuration cannot implement stable optical communication because such restriction plates would reduce even the amount of the infrared beam for communication.

SUMMARY OF THE INVENTION

It is therefore an object of the present invention to provide an electronic apparatus with an optical communication capability and insuring stable optical communication in various environments by providing its optical filter with a variable screening characteristic so as to screen various kinds of optical noise.

In order to achieve the above object, an electronic apparatus having an optical communication capability using an infrared beam emitting/receiving device of the present invention has a casing, and a plurality of optical filters each having a particular screening characteristic and selectively used to screen the infrared beam emitting/receiving device.

With the above arrangement, it is possible to selectively use the optical filters different in screening characteristic in accordance with the environment, intercepting optical noise of various wavelengths. This insures stable communication in various environments.

In a preferred embodiment, the optical filters are selectively removably mounted to a beam input/output window formed in the casing. The filters different only in screening characteristic can be selectively used in accordance with the environment, intercepting optical noise of various wavelengths.

In another preferred embodiment, the optical filters are slidably disposed in a beam input/output window formed in the casing. This is also successful to selectively use the filters in accordance with the environment.

BRIEF DESCRIPTION OF THE DRAWINGS

The above and other objects, features and advantages of the present invention will become apparent from the following detailed description taken with the accompanying drawings in which.

Figure 1A:
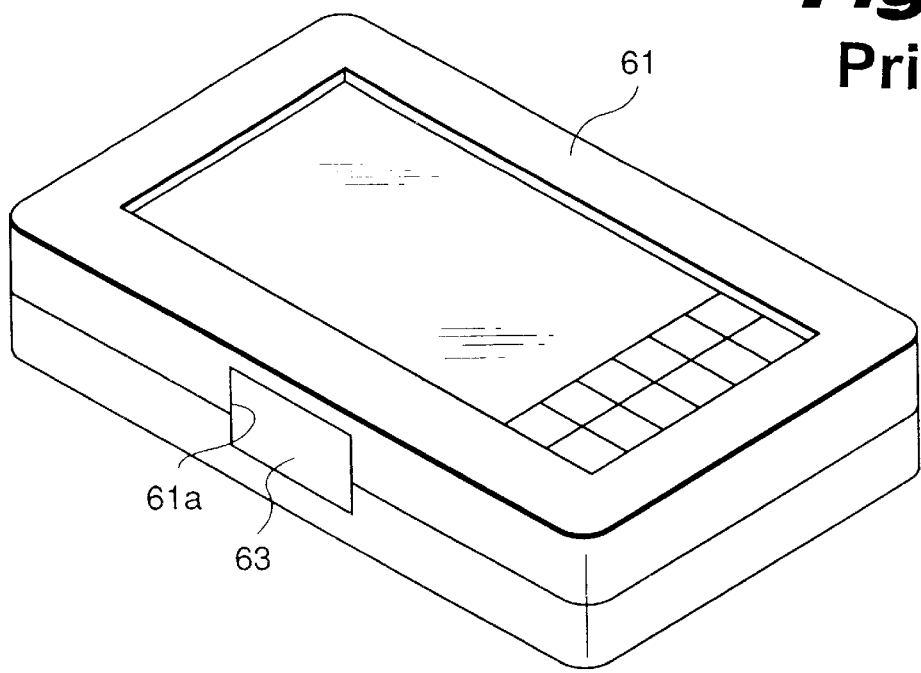
FIGS. 1A and 1B are respectively a perspective view and a partly sectional plan view showing a conventional electronic apparatus with an optical communication capability.

In the drawings, identical references denote identical structural elements.

DETAILED DESCRIPTION OF THE PREFERRED EMBODIMENTS

Figure 1B:
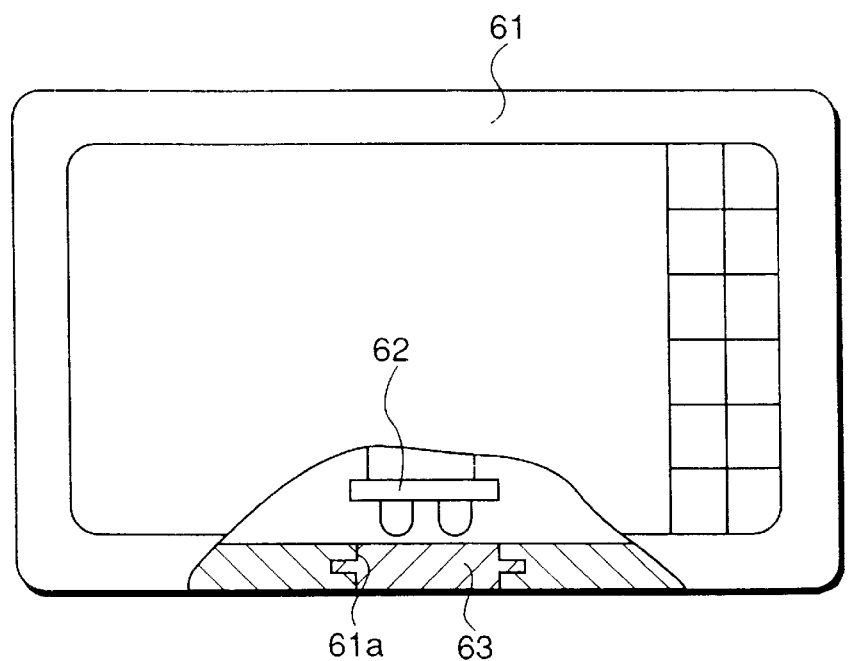

To better understand the present invention, brief reference will be made to a conventional electronic apparatus with an optical communication capability, shown in FIGS. 1A and 1B. As shown, the electronic apparatus has a casing 61 formed with a beam input/output window 61a in one side wall thereof. An infrared beam emitting/receiving device 62 is disposed in the casing 61 and faces the window 61a.

Generally, light incident to the above apparatus includes components lying in the wavelength range adversely affecting the emitting/receiving device 62 (optical noise), as stated earlier. An optical filter 63 having a preselected screening characteristic is fitted in the window 61a in order to intercept the optical noise otherwise reaching the device 62 and causing the apparatus to malfunction. However, the problem with the conventional apparatus is that the filter 63 fitted in the window 61a cannot be replaced with another optical filter having a different screening characteristic in accordance with the varying environment.

Figure 2:
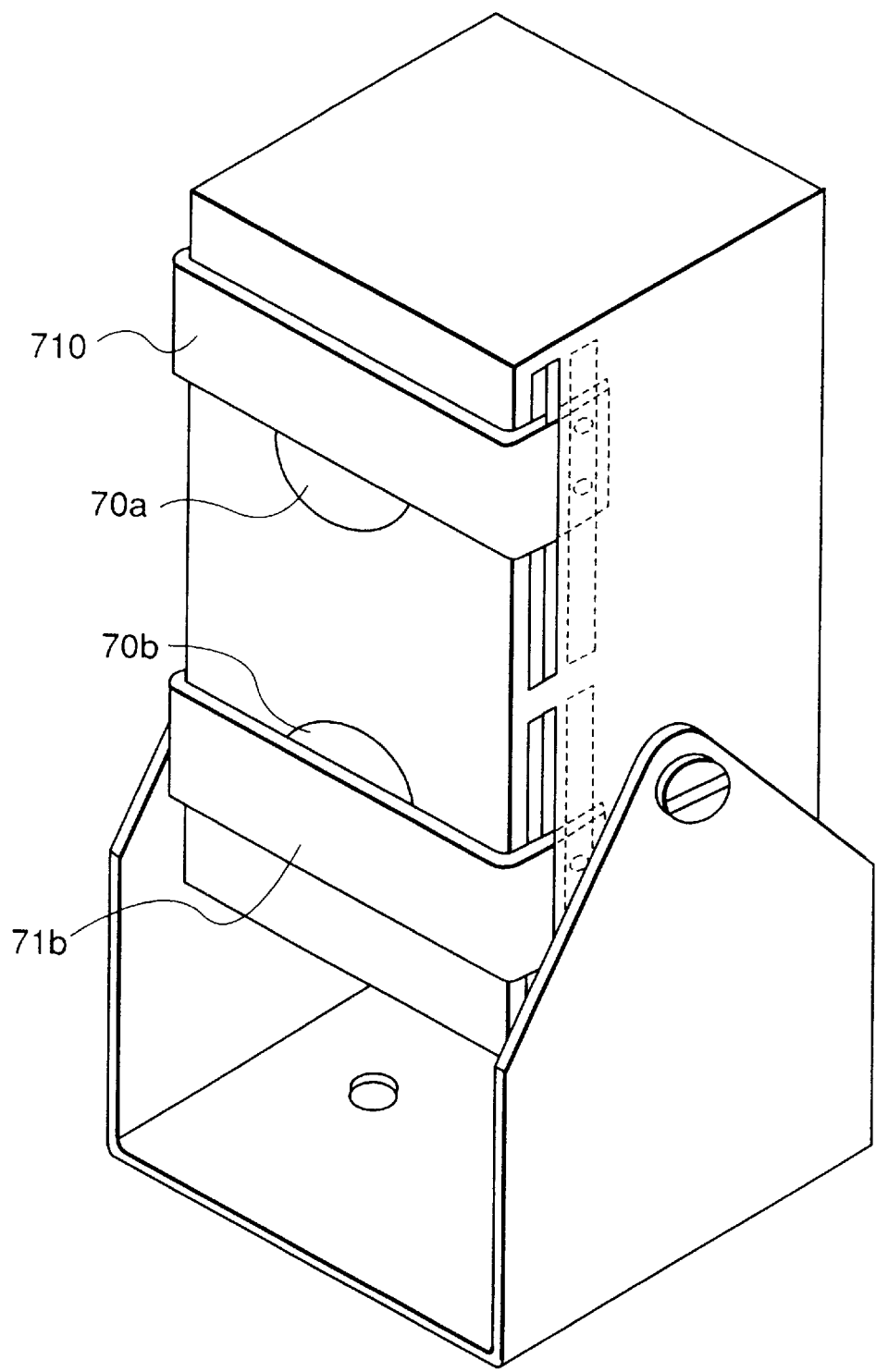
FIG. 2 is a perspective view showing another conventional electronic apparatus with the above capability.

Japanese Patent Laid-Open Publication No. 4-161831 proposes a detector using an infrared beam although it is different from an electronic apparatus with an optical communication capability. As shown in FIG. 2, the detector is formed with a beam output window 70a and a beam input window 70b. Slidable restriction plates 71a and 71b are mounted on the detector and assigned to the windows 70a and 70b, respectively. The restriction plate 70a is slidable to reduce an infrared beam to be output via the window 70a, and therefore the beam to be diffused around the detector. The restriction plate 71b is slidable to prevent the beam diffused around the detector from being incident to the window 70b. The plates 71a and 71b prevent the detector from malfunctioning. However, this kind of configuration cannot implement stable optical communication because such restriction plates would reduce even the amount of the infrared beam for communication if applied to the window 61a of the previous conventional apparatus.

Figure 3:
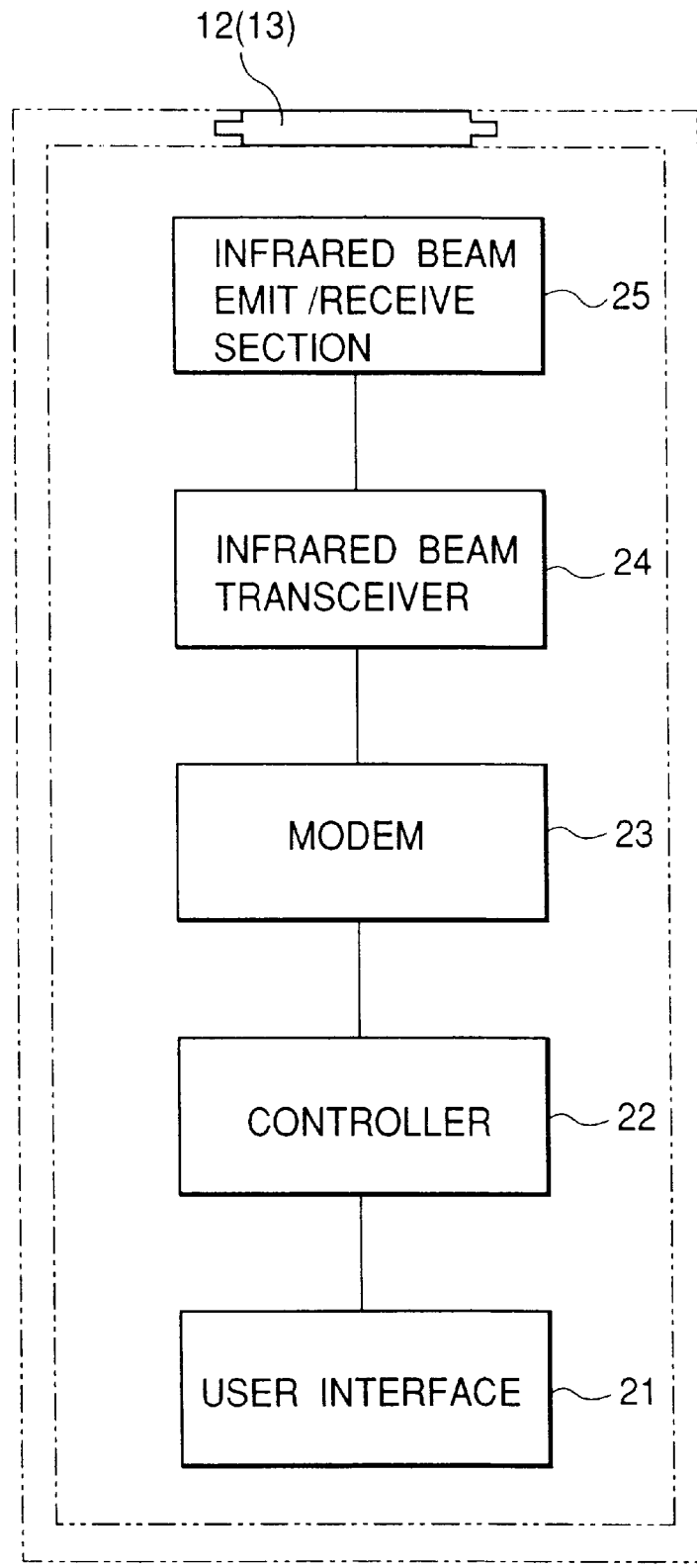
FIG. 3 is a block diagram schematically showing a first embodiment of the electronic apparatus with an optical communication capability in accordance with the present invention.

Referring to FIG. 3, a first embodiment of the electronic apparatus in accordance with the present invention will be described. As shown, the apparatus has a user interface 21, a controller 22, a modem 23, an infrared beam transceiver 24, and an infrared beam emitting/receiving device 25 arranged thereinside.

Figure 5:
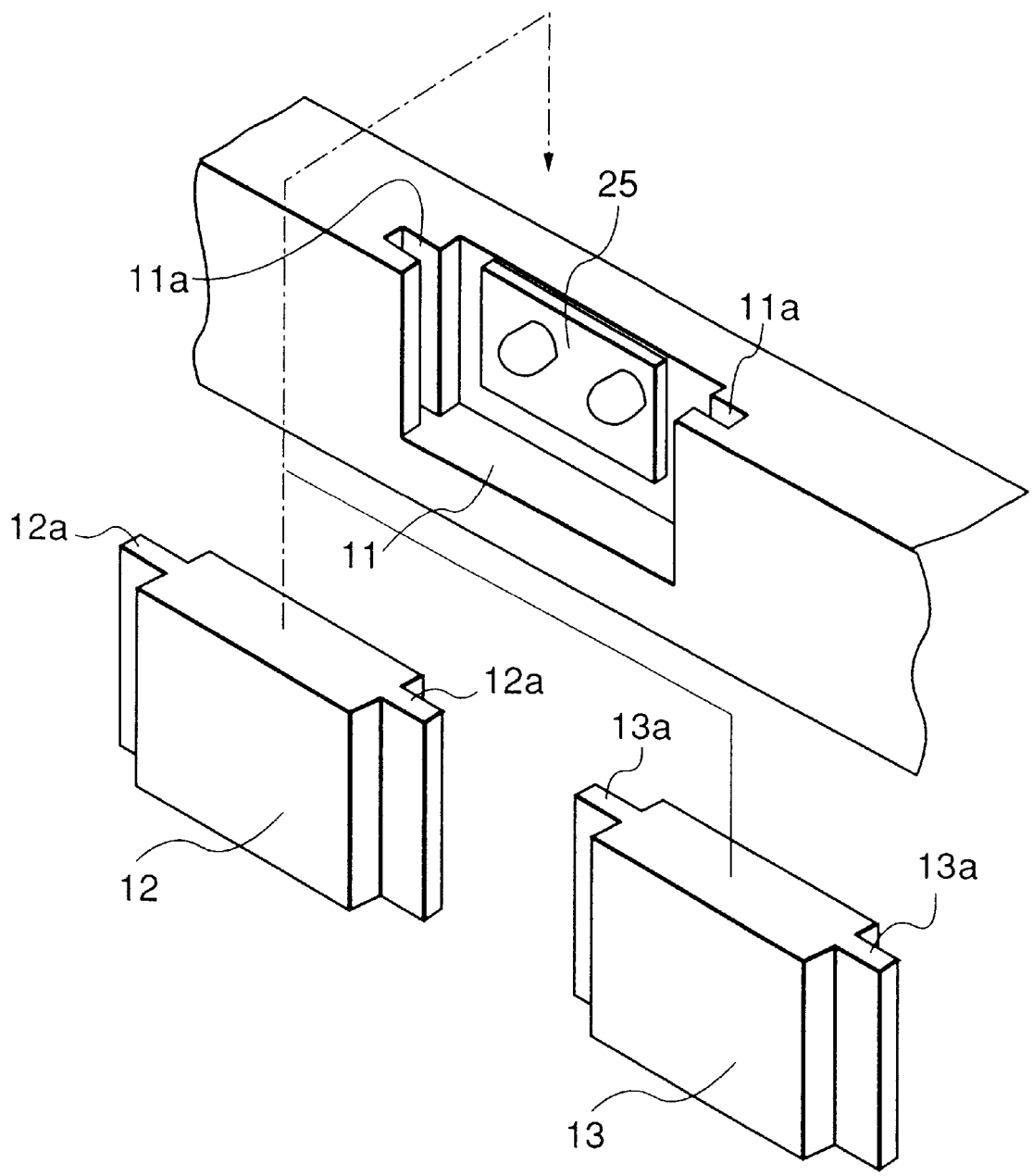
FIG. 5 is a fragmentary enlarged view of the first embodiment.

As shown in FIG. 5, the apparatus has a casing 10. One of side walls included in the casing 10 is notched over about one half of its thickness in order to form a beam input/output window 11. Guide grooves 11a are respectively formed in the opposite side edges of the window 11. The infrared beam emitting/receiving device 25 is buried in the above side wall over the other half of the thickness.

Figure 4A:
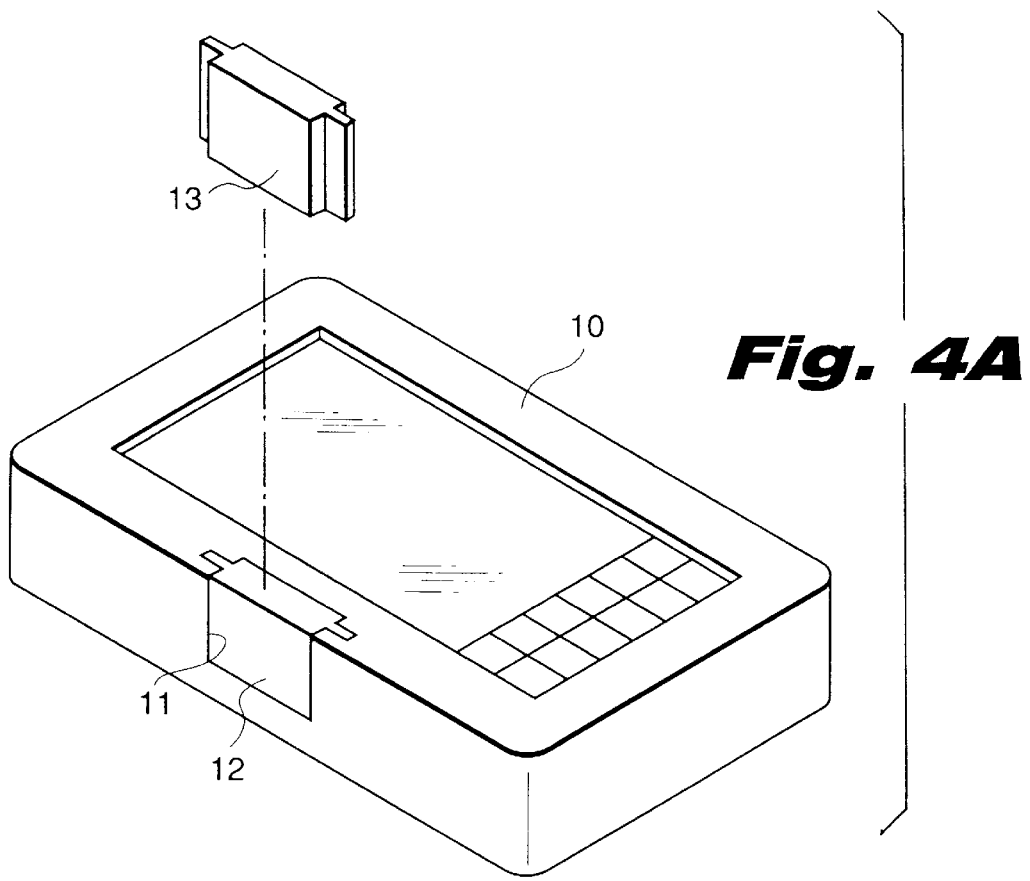
FIGS. 4A and 4B are respectively a perspective view and a partly sectional plan view of the first embodiment.
Figure 4B:
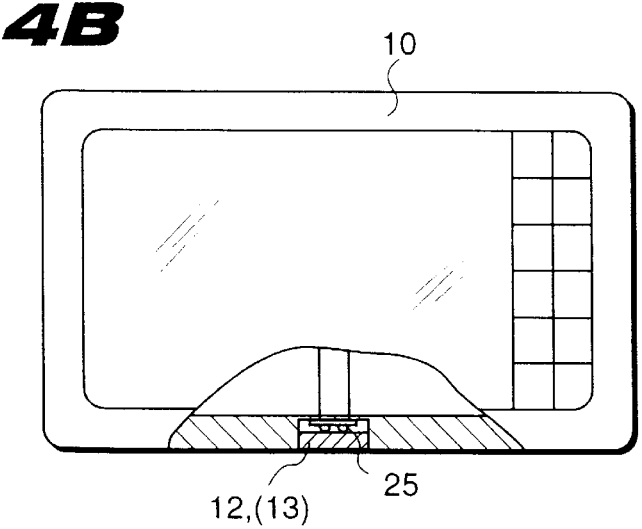

As shown in FIGS. 4A and 4B as well as in FIG. 5, optical filters 12 and 13 are identical in configuration except for their screening characteristic. The filters 12 and 13 each has projections 12a or 13a at opposite sides thereof. One of the filters 12 and 13 is fitted in the window 11 with the projections 12a or 13a slidably received in the guide grooves 11a of the window 11.

In the above construction, the filters 12 and 13 each having a particular screening characteristic can be selectively mounted to the casing 10 in accordance with the varying environment. With these filters 12 and 13, it is possible to intercept optical noise lying in a broad wavelength range, and therefore to implement stable communication in various environments. If desired, three or more optical filters each having a particular screening characteristic may be prepared in order to intercept various kinds of optical noise.

Figure 6A:
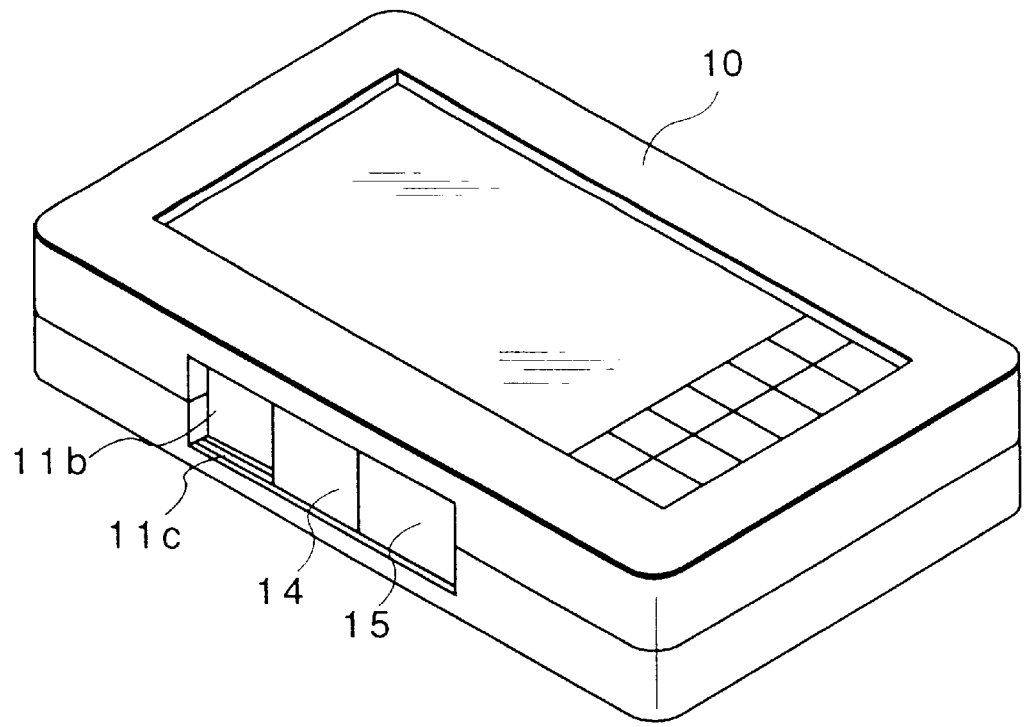
FIGS. 6A and 6B are respectively a perspective view and a partly sectional plan view showing a second embodiment of the present invention.
Figure 6B:
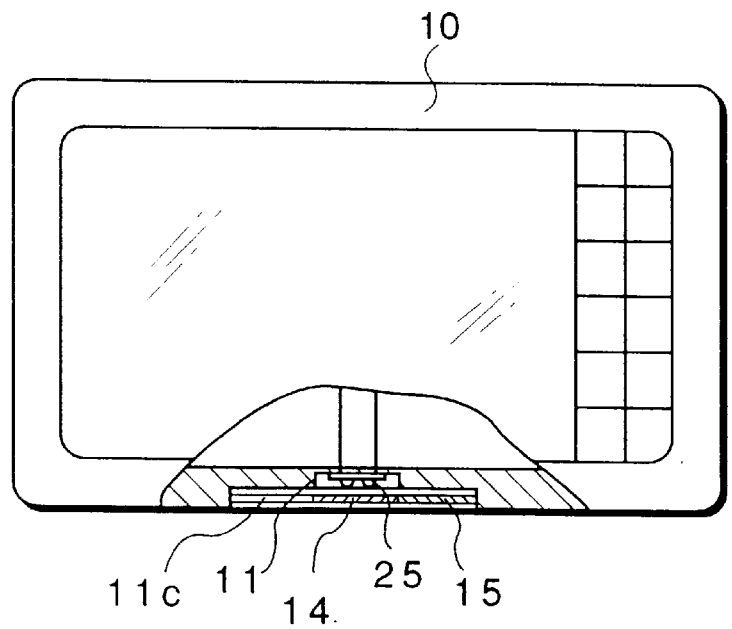
Figure 7A:
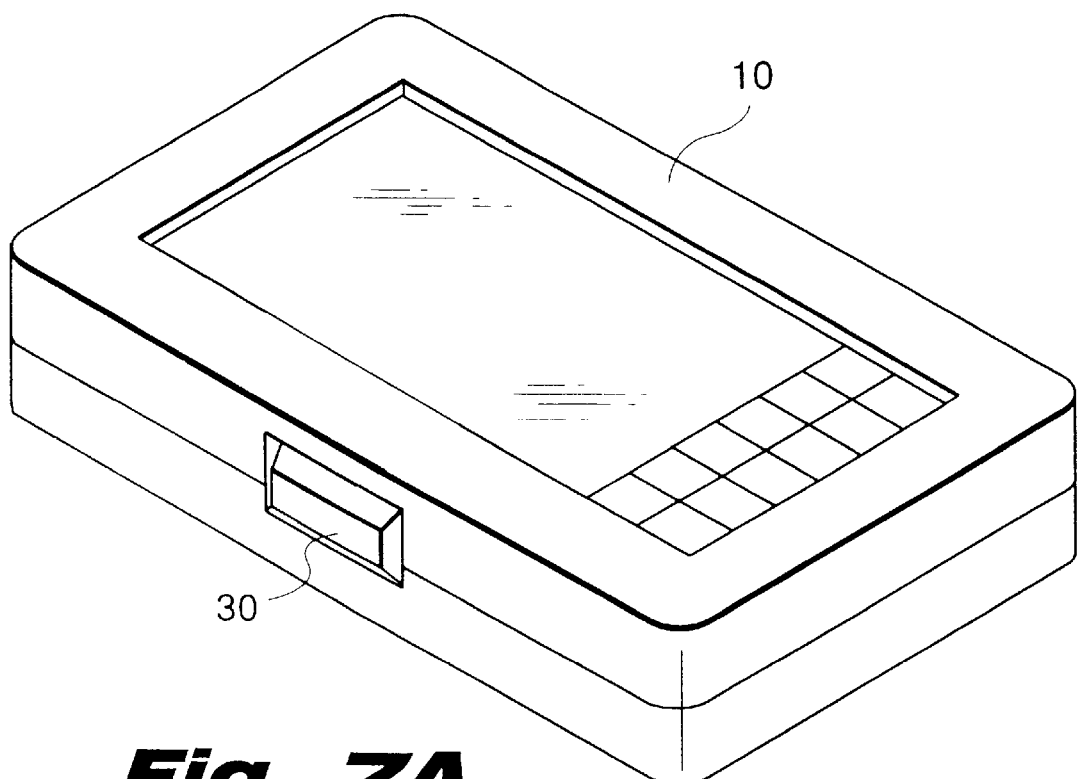
FIGS. 7A and 7B are respectively a perspective view of a third embodiment of the present invention and a perspective view of a filter assembly included in the third embodiment.
Figure 7B:
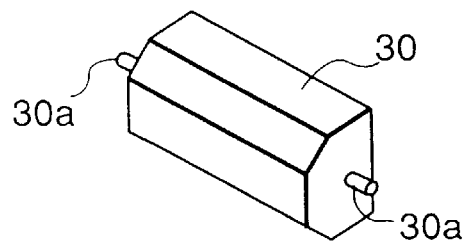

FIGS. 6A and 6B show a second embodiment of the present invention. As shown, an electronic apparatus includes the casing 10 having the window 11 in one side wall thereof, and a filter mounting portion 11b in the same side wall. Guide grooves 11c are respectively formed in the upper and lower walls of the portion 11b. Two optical filters 14 and 15 are slidably positioned in the portion 11b and guided by the guide grooves 11c. The filters 14 and 15 each has a particular screening characteristic.

In this embodiment, one of the filters 14 and 15 whose screening characteristic matches the current environment is slid along the guide grooves 11c to a position where it faces the window 11. With these filters 14 and 15, it is also possible to intercept optical noise lying in a broad wavelength range, and therefore to implement stable communication in various environments.

If desired, the length of the filter mounting portion 11b may be increased in order to accommodate three or more optical filters. Alternatively, use may be made of different kinds of optical filters replaceable with each other, as in the first embodiment. Further, the filters 14 and 15 located at the outside of the window 11 may be positioned at the inside of the window 11, if desired.

Figure 8A:
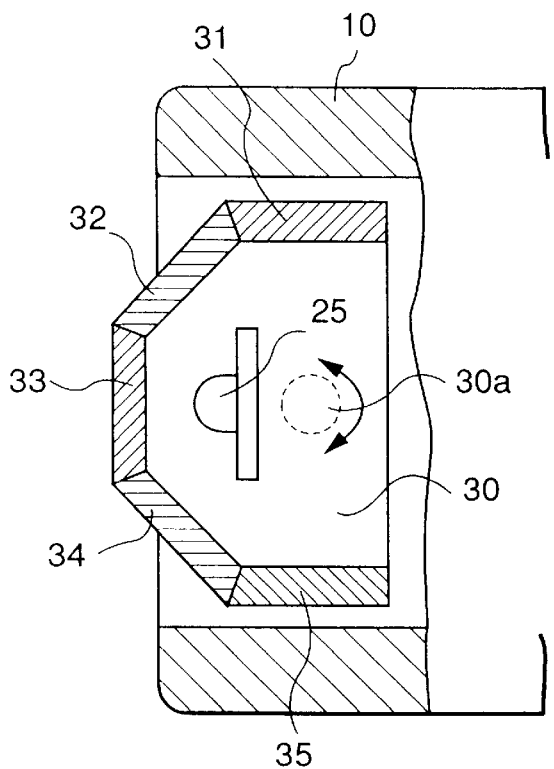
FIGS. 8A and 8B demonstrate how one of optical filters constituting the filter assembly is selected.
Figure 8B:
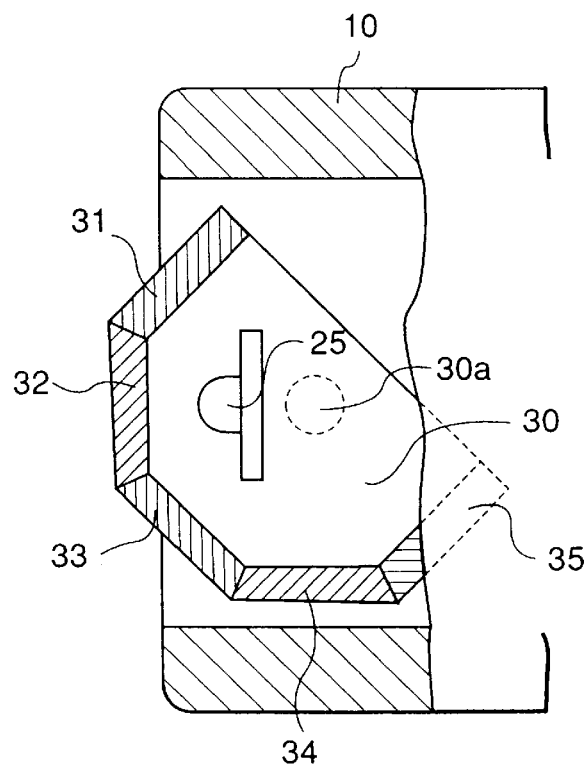

FIGS. 7A, 7B, 8A and 8B show a third embodiment of the present invention. As shown, an electronic apparatus has a filter assembly 30 made up of a plurality of optical filters 31, 32, 33, 34 and 35 continuously connected together. The filters 31–35 each has a particular screening characteristic. Stub shafts 30a extend out from the opposite ends of the filter assembly 30. The filter assembly 30 is rotatably mounted on the casing 10 via the shafts 30a such that desired one of the filters 31–35 faces the window 11, as shown in FIGS. 8A or 8B.

In the above configuration, one of the filters 31–35 matching the environment can be brought into alignment with the window 11. This also successfully intercepts optical noise lying in a broad wavelength range and thereby insures stable optical communication in various environments.

In any one of the first to third embodiments, the optical filters different in screening characteristic from each other may be replaced with optical filters having the same screening characteristic, in which case a suitable number of filters will be superposed in order to implement a screening characteristic matching the environment.

What is claimed is:

1. An electronic apparatus having an optical communication capability using an infrared beam emitting/receiving device, comprising a casing, and a plurality of optical filters each having a particular screening characteristic and selectively used to screen said infrared beam emitting/receiving device.

2. An apparatus as claimed in claim 1, wherein said plurality of filters are selectively removably mounted to a beam input/output window formed in said casing.

3. An apparatus as claimed in claim 1 or 2, wherein said plurality of optical filters are slidably disposed in a beam input/output window formed in said casing.

4. An electronic apparatus having an optical communication capability, comprising a casing, and a filter assembly comprising a plurality of optical filters continuously connected together and each having a particular screening characteristic, said filter assembly being rotatably mounted on said casing such that any one of said plurality of optical filters faces a beam input/output window of said apparatus.

5. An electronic apparatus having an optical communication capability using an infrared beam emitting/receiving device, comprising a plurality of optical filters having a same screening characteristic, a suitable number of said plurality of optical filters being superposed to implement a desired screening characteristic for screening said infrared beam emitting/receiving device.

* * * * *